Dec. 4, 1962 R. W. FRANK 3,067,388
BISTABLE COUNTER WITH CONSTANT CURRENT TUBES CONNECTED TO GRIDS
Filed Aug. 27, 1957
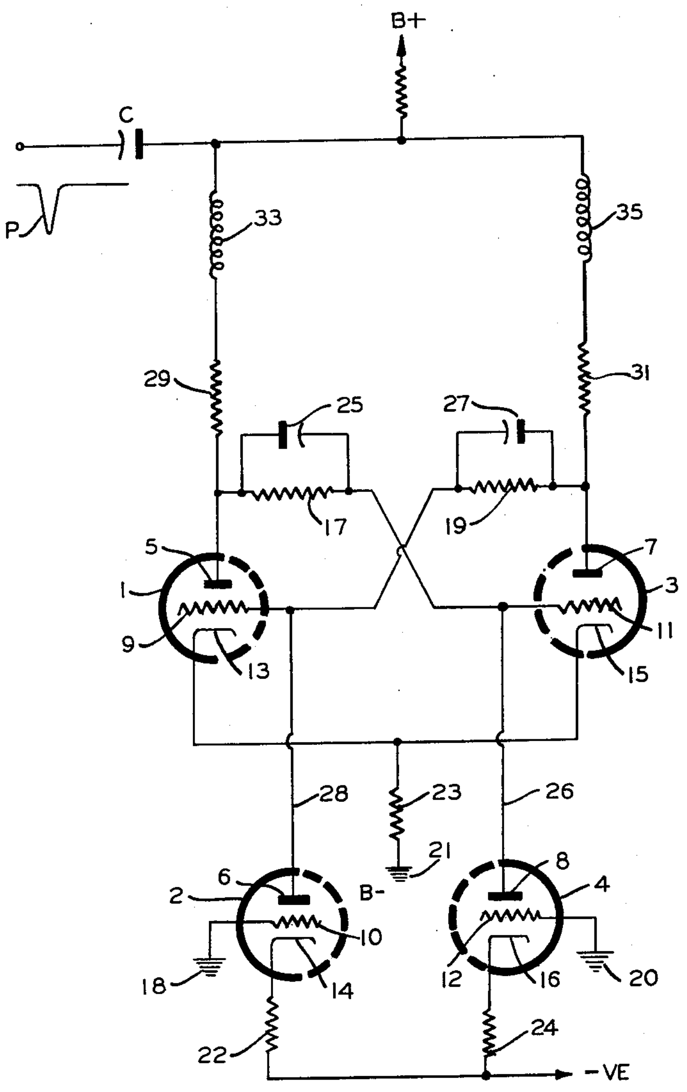
INVENTOR.
RICHARD FRANK
BY Rines and Rines
ATTORNEYS United States Patent Office 3,067,388 Patented Dec. 4, 1962

3,067,388

BISTABLE COUNTER WITH CONSTANT CURRENT TUBES CONNECTED TO GRIDS

Richard W. Frank, Concord, Mass., assignor to General Radio Company, Cambridge, Mass., a corporation of Massachusetts Filed Aug. 27, 1957, Ser. No. 680,542
10 Claims. (Cl. 328—203)

The present invention relates to electric systems and, more particularly, to bistable counting circuits; though, as hereinafter explained, the invention is not limited thereto.

Bistable counter circuits, such as multivibrator or "flip-flop" circuits, are widely used in electronic computer and other systems. These circuits involve the employment of switching devices, such as electron tubes, transistors and the like, connected in pairs such that when one tube or other switching device conducts, it automatically shuts off the other tube of the pair, and vice versa. It becomes quite difficult, however, to operate these circuits at very high counting or switching frequencies; say, of the order of ten megacycles and above.

This is because, when a bistable counter circuit is triggered, the conducting switching device switches to the non-conducting or opposite state while, at the same time, the second switching device changes from the non-conducting to the conducting state. The second switching device then holds the first switching device in a state opposite to that existing before the triggering signal. This operation of the pair of devices must be sufficiently rapid that the changes of state are complete, or nearly complete, before the occurrence of the next triggering signal. For example, the entire switching sequence must occur, and the switching devices must have reached equilibrium, in less than one tenth of a microsecond if the driving signal is occurring at a ten megacycle rate. It is a further condition that, if the triggering signals are suddenly terminated, the pair of switching devices constituting the bistable counter must remain in the state established by the last triggering signal for all succeeding time.

It is well known that the speed at which electronic switching devices can change state depends upon the effective transconductance of the device, upon their coupling means, and upon the magnitude of the shunting capacitance that must be charged before the states can be considered to have reversed. Increased speed can be obtained by: (1) using switching devices of high effective transconductance, (2) using coupling circuits that introduce minimum loss between the two switching devices, and (3) reducing shunt capacitances to a minimum. The present invention relates in particular to technique (2) above, demonstrating that the loss in the coupling device can be economically and reliably reduced to almost zero.

Normally, in the bistable multivibrator, the output terminal or electrode of the two switching devices is connected to the input terminal or electrode of its companion device by a resistive network that determines the correct direct-current supply voltage upon the input electrode. While necessary to set these operating potentials, the resistive network produces a loss in the switching signal and reduces speed. Other previously known techniques for setting the correct operating voltages or currents, designed to avoid reducing speeds, are cumbersome and inefficient. Among these techniques are coupling with batteries; with gas devices, such as voltage-regulator tube; with semiconductor devices such as silicon diodes in the avalanche breakdown region; and so on. The simple resistive coupling system, which is, in effect, a voltage divider, can theoretically be used to produce an arbitrarily small loss if a sufficiently large power supply is used. In practice, however, the need for close-tolerance components and critical power-supply regulation makes this approach impractical. All of the above-mentioned prior-art systems, however, either use large, cumbersome, and expensive components, or else utilize considerable power and require that close tolerance components and highly regulated power supplies be employed.

An object of the present invention, accordingly, is to provide a new and improved bistable counter that shall not be subject to the above-described disadvantages and that shall still permit of operation at very high frequencies. In summary, this end is achieved by employing a shunt-connected substantially constant-current circuit, disposed in each of the input circuits of the bistable counter devices and having a low direct-current impedance but presenting a high impedance to incremental voltage changes. Preferred circuit and other details are presented hereinafter.

A further object of the invention is to provide a new and improved direct-current amplifying circuit that is of more general utility than the specific illustrated bistable counter circuit application thereof.

Other and further objects will be explained hereinafter and will be more particularly pointed out in the appended claims.

The invention will now be described in connection with the accompanying drawing, the single FIGURE of which is a schematic circuit diagram illustrating a preferred application of the invention to the bistable counter systems before mentioned.

For purposes of illustration, the bistable counter circuit is illustrated as of the electron-tube amplifier type comprising a pair of electron tubes 1 and 3 which may, if desired, comprise double triode or other electron-tube configurations within a single envelope. Each of the tubes 1 and 3 is shown provided with respective anode or plate electrodes 5 and 7, control-grid electrodes 9 and 11, and cathodes 13 and 15. It is, of course, to be understood that other types of well-known multivibrator, "flip-flop" or relaxation oscillator circuits may also be employed, as may other devices than electron tubes, as previously mentioned. Since the operation of the bistable counter circuit is so well known, it will not be detailed herein other than to state that the anode or plate 5 of the tube 1 is coupled through a series-connected direct-current resistor 17 to the input-circuit control-grid electrode 11 of the tube 3. The output of the tube 3 is, in turn, similarly coupled by a connection from its anode or plate 7 through a similar series-connected resistor 19 to the input-circuit control-grid electrode 9 of the tube 1. The cathodes 13 and 15 of the tubes 1 and 3 are shown connected to the ground terminal 21 through preferably a common resistor 23. The term "ground" as used herein is intended to connote not only actual earthing but also chassis or other reference potential. Connected across or in shunt with each of the direct-current coupling resistors 17 and 19 are respective capacitors 25 and 27 which will be hereinafter described. Each of the anode electrodes or plates 5 and 7 is shown connected through preferably similar resistors 29 and 31 and hereinafter-described inductors 33 and 35 to the positive or B+ terminal of the source of anode potential, the negative terminal B− of which may be connected to the before-mentioned ground terminal 21. The bistable counter 1, 3 may be operated by trigger pulses P applied, for example, through a coupling condenser C connected to the upper terminals of the inductors 33 and 35.

In accordance with the present invention, the above-described circuit is adapted to operate at very high frequencies through the expedient of providing in shunt with the input circuits of each of the amplifiers 1 and 3, a direct-current impedance of low value, which, none-the-less, presents a substantially high incremental-voltage impedance to voltage changes in the system. In the preferred illustration, this impedance assumes the form of the pair of substantially constant-current-operated electrol tubes 2 and 4, shown provided with respective anodes or plates 6 and 8, control-grid electrodes 10 and 12, and cathodes 14 and 16. The control electrodes 10 and 12 are respectively connected to the ground terminals 18 and 20 which, in turn, connect with the before-mentioned ground terminal 21. The cathodes 14 and 16 are connected through respective cathode resistors 22 and 24 to a source of negative bias potential labelled $-Ve$, the positive terminal of which may be the before-mentioned ground terminal 21. Each of the tubes 2 and 4 is respectively connected in shunt with the input circuits of the respective bistable counter tubes 1 and 3. Thus, the anode 6 is shown connected to a point of the input circuit of the tube 1 intermediate the coupling resistor 19 and the control-grid electrode 9, and the anode 8 of the tube 4 is similarly shown connected by conductor 26 to the control-grid electrode 11 of the tube 3.

In operation, the bistable counter tubes 1 and 3 preferably do not draw grid current. The substantially constant-current tubes 2 and 4 permit very high-speed recovery of the input circuits of the tubes 1 and 3 after the respective tubes have been cut off, thereby permitting very high speed or high-frequency operation of the bistable counter. Unlike prior-art high-resistance grid return proposals operating with very high voltage values and consuming high power, moreover, the present circuit involves the utilization merely of a negative bias potential $-Ve$ which may be of the same order of magnitude as the anode potential B+. A great saving of power over such prior-art proposals, therefore, is attained with the aid of the present invention through the utilization of the constant-current tubes 2 and 4 that operate normally to provide a low direct-current impedance, but a high impedance to incremental voltage changes.

In order to provide not only substantially unity coupling for direct-current components of the signals involved in the switching of the bistable counter circuit 1, 3, but also to provide substantially unity coupling for alternating-current components, as well, the capacitors 25 and 27 are each preferably made quite large so that the input capacitance to the stages 1 and 3 causes a negligible reduction of coupling gain at the high frequencies of switching. Since the capacitors 25 and 27 are made large, however, they can no longer serve the function they normally serve in conventional bistable circuits of this character; namely, as energy-storage devices that indicate, through the difference in charge thereupon, which of the tubes 1 or 3 was last conducting, thus avoiding improper operation of the circuit. This indication or memory function of the capacitors 25 and 27 is provided, rather, in accordance with the present invention, by means of the before-mentioned inductors 33 and 35 connected to the respective anodes 5 and 7 of the tubes 1 and 3. Since the inductors 33 and 35 carry the plate current of the tubes 1 and 3, the voltage developed thereacross will indicate, through the relative operational characteristics of the same, which of the tubes 1 and 3 was drawing substantially full plate current the last, thus insuring proper operation of the bistable counter circuit.

For operation at frequencies in excess of ten megacycles, for example, the following circuit components have been found to perform satisfactorily, in practice. With tubes 1 and 3 of the 5687 type, as an illustration, operating with a plate voltage B+ of about 150 volts and with inductors 33, 35 of about 4.7 microhenries, plate load resistors, 29, 31, of about 500 ohms, direct-current coupling impedances 17 and 19 of about 200,000 ohms and capacitors 25 and 27 of large value of about 0.01 microfarad, it was found possible to employ a negative bias $-Ve$ for substantially constant-current tubes 2 and 4 of a 5751 or 12AX7 double triode of only about −150 volts. The common cathode resistors 23 may have a value of about 2500 ohms and the cathode resistors 22 and 24, a value of about 300,000 ohms. Under such circumstances, the current flowing substantially constantly through the tubes 2 and 4 connected in the input circuits of the respective stages 1 and 3 is of the order of 0.5 milliampere, and the above-described novel results are produced.

As before indicated, while the input circuit of the present invention is particularly useful for bistable counter operation, as above described, it may also be used with other types of direct-current amplifier stages where the advantageous features, before explained, are desired.

Further modifications will occur to those skilled in the art and all such are considered to fall within the spirit and scope of the invention as defined in the appended claims.

What is claimed is:

1. A bistable counter circuit having, in combination, a pair of amplifiers each provided with input and output circuits, the output circuit of each amplifier being connected by direct-current coupling means to the input circuit of the other amplifier of the pair, and a substantially constant current device shunt-connected in each input circuit having a low direct-current impedance but a high impedance to incremental voltage changes.

2. A bistable counter circuit having, in combination, a pair of amplifiers each provided with input and output circuits, the output circuit of each amplifier being connected by direct-current coupling means to the input circuit of the other amplifier of the pair, a pair of electron tubes each having an anode, a control electrode and a cathode connected to a source of potential more negative than that of the control electrode, and means for shunt-connecting one of the electron tubes in each of the said input circuits.

3. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, a second pair of electron tubes each provided with an anode, a control electrode and a cathode connected to a source of potential more negative than that of the control electrode, and means for connecting the anode of each of the second pair of electron tubes to the control electrode of a corresponding tube of the first pair of electron tubes.

4. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, and shunt-connected substantially constant-current means disposed in each input circuit having a low direct-current impedance but a high impedance to incremental voltage changes.

5. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, each anode being connected to a source of anode potential through an inductor for assisting in determining which tube of the pair has most recently conducted, and shunt-connected substantially constant-current means disposed in each input circuit having a low direct-current impedance but a high impedance to incremental voltage changes.

6. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, each direct-current coupling impedance being shunted by an alternating-current impedance of sufficiently small value to compare with the impedance of the tubes during the conduction of the same, a second pair of electron tubes each provided with an anode, a control electrode and a cathode connected to a source of potential more negative than that of the control electrode, and means for connecting the anode of each of the second pair of electron tubes to the control electrode of a corresponding tube of the first pair of electron tubes.

7. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, each anode being connected to a source of anode potential through an inductor for assisting in determining which tube of the pair has most recently conducted, a second pair of electron tubes each provided with an anode, a control electrode and a cathode connected to a source of potential more negative than that of the control electrode, and means for connecting the anode of each of the second pair of electron tubes to the control electrode of a corresponding tube of the first pair of electron tubes.

8. A bistable counter circuit having, in combination, a first pair of electron tubes each provided with an anode, a control electrode and a cathode, the anode of each tube being connected through a direct-current coupling impedance to the control electrode of the other amplifier and the cathodes of both tubes being grounded through direct-current impedance, each anode being connected to a source of anode potential through an inductor for assisting in determining which tube of the pair has most recently conducted, and each direct-current coupling impedance being shunted by an alternating-current impedance of sufficiently small value to compare with the impedance of the tubes during the conduction of the same, a second pair of electron tubes each provided with an anode, a control electrode and a cathode connected to a source of potential more negative than that of the control electrode, and means for connecting the anode of each of the second pair of electron tubes to the control electrode of a corresponding tube of the first pair of electron tubes.

9. An electric circuit having, in combination, a pair of amplifiers each provided with input and output circuits, the output circuit of each amplifier being connected by direct-current coupling means to the input circuit of the other amplifier of the pair, and a substantially constant current device shunt-connected in each input circuit having a low direct-current impedance but a high impedance to incremental voltage changes.

10. An electric circuit having, in combination, a pair of amplifiers each provided with input and output circuits, the output circuit of each amplifier being connected by direct-current coupling means to the input circuit of the other amplifier of the pair, a pair of electron tubes each having an anode, a control electrode and a cathode connected to a source of potential more negative than that of the control electrode, and means for shunt-connecting one of the electron tubes in each of the said input circuits.

References Cited in the file of this patent

UNITED STATES PATENTS

| | | |
|---|---|---|
| 2,154,492 | Clough | Apr. 18, 1939 |
| 2,272,070 | Reeves | Feb. 3, 1942 |
| 2,417,522 | Shenk | Mar. 18, 1947 |
| 2,445,448 | Miller | July 20, 1948 |
| 2,540,539 | Moore | Feb. 6, 1951 |
| 2,545,924 | Johnstone | Mar. 20, 1951 |
| 2,550,116 | Grosdoff | Apr. 24, 1951 |
| 2,596,956 | Nierman | May 13, 1952 |
| 2,762,917 | Sharin et al. | Sept. 11, 1956 |
| 2,848,610 | Freienmuth | Aug. 19, 1958 |
| 2,882,397 | Favre | Apr. 14, 1959 |

FOREIGN PATENTS

| | | |
|---|---|---|
| 251,520 | Switzerland | Aug. 2, 1948 |